US012062893B2

(12) United States Patent
Bianchi et al.

(10) Patent No.: US 12,062,893 B2
(45) Date of Patent: Aug. 13, 2024

(54) CABLE SUPPORT BRACKETS

(71) Applicant: CommScope Technologies LLC, Hickory, NC (US)

(72) Inventors: Ronald J. Bianchi, Frankfort, IL (US); James Leonard Schneider, Downers Grove, IL (US)

(73) Assignee: Outdoor Wireless Networks LLC, Claremont, NC (US)

( * ) Notice: Subject to any disclaimer, the term of this patent is extended or adjusted under 35 U.S.C. 154(b) by 517 days.

(21) Appl. No.: 17/415,098

(22) PCT Filed: Jan. 9, 2020

(86) PCT No.: PCT/US2020/012864
§ 371 (c)(1),
(2) Date: Jun. 17, 2021

(87) PCT Pub. No.: WO2020/146584
PCT Pub. Date: Jul. 16, 2020

(65) Prior Publication Data
US 2022/0045493 A1 Feb. 10, 2022

Related U.S. Application Data

(60) Provisional application No. 62/791,104, filed on Jan. 11, 2019.

(51) Int. Cl.
*H02G 3/04* (2006.01)
*H01Q 1/24* (2006.01)
(Continued)

(52) U.S. Cl.
CPC .......... *H02G 3/0456* (2013.01); *H01Q 1/246* (2013.01); *H01R 13/58* (2013.01); *H01R 24/542* (2013.01)

(58) Field of Classification Search
CPC .......... H01Q 1/12; H01Q 1/246; H01R 13/58; H01R 24/542; H02G 3/0456
See application file for complete search history.

(56) References Cited

U.S. PATENT DOCUMENTS 9,841,123 B1 * 12/2017 White ................. H02G 3/0608
2003/0178535 A1 * 9/2003 Jette ..................... H02G 3/0443
248/49

(Continued)

FOREIGN PATENT DOCUMENTS

CN 202797276 U 3/2013
JP 2004073000 A 3/2004
(Continued)

OTHER PUBLICATIONS

"International Search Report and Written Opinion corresponding to International Application No. PCT/2020/012864 mailed May 7, 2020".

(Continued)

*Primary Examiner* — Thien M Le
(74) *Attorney, Agent, or Firm* — Myers Bigel, P.A.

(57) ABSTRACT

The present disclosure describes a cable support bracket. The cable support bracket may include a base configured to be mounted to an antenna, the base comprising a plurality of apertures, each aperture configured to receive a cable hanger; a cable guide having a generally arced outer profile, wherein the cable guide is coupled to or integral with the base and extends outwardly from one end of the base; and a plurality of cable hangers, each cable hanger secured in a respective aperture in the base. The cable support bracket may further include a bridge removably attached to the base, the bridge having a plurality of apertures, each bridge aperture configured to receive a respective cable hanger; and a second plurality of cable hangers, each cable hanger secured in a respective aperture in the bridge. Antenna (Continued)

assemblies and methods for organizing coaxial cable connections at a base station antenna are also provided.

20 Claims, 13 Drawing Sheets

(51) Int. Cl.
  *H01R 13/58* (2006.01)
  *H01R 24/54* (2011.01)

(56) References Cited

U.S. PATENT DOCUMENTS

| | | | | |
|---|---|---|---|---|
| 2007/0021095 | A1* | 1/2007 | Cheng | H01Q 3/2611 455/403 |
| 2009/0231794 | A1* | 9/2009 | Bhutani | H05K 5/0017 445/24 |
| 2011/0075646 | A1* | 3/2011 | Smith | H04W 84/14 370/338 |
| 2019/0006827 | A1* | 1/2019 | Gintz | F16L 3/08 |
| 2020/0119425 | A1* | 4/2020 | Pounds | H01Q 1/1264 |
| 2022/0263304 | A1* | 8/2022 | Bell | H02G 3/32 |
| 2022/0359102 | A1* | 11/2022 | Michael | H01B 7/0045 |
| 2022/0360059 | A1* | 11/2022 | Michael | H02S 30/10 |
| 2023/0291188 | A1* | 9/2023 | Khalkar | H02G 3/0456 248/49 |

FOREIGN PATENT DOCUMENTS

| | | |
|---|---|---|
| JP | 2010255760 A | 11/2010 |
| JP | 6116518 B2 | 3/2017 |
| KR | 100772839 81 | 11/2007 |

OTHER PUBLICATIONS

"International Preliminary Report on Patentability corresponding to International Application No. PCT/2020/012864 mailed Jul. 22, 2021".

* cited by examiner

CABLE SUPPORT BRACKETS

RELATED APPLICATION

The present application is a 35 U.S.C. § 371 national phase application of PCT Application PCT/US2020/012864, filed Jan. 9, 2020, which claims priority from and the benefit of U.S. Provisional Patent Application No. 62/791,104, filed Jan. 11, 2019, the disclosure of which is hereby incorporated herein by reference in full.

FIELD

The present invention is directed generally toward telecommunications equipment, and more particularly, support brackets for coaxial cable connections with an antenna.

BACKGROUND

With increased demand for more wireless communication, the number of radio and antenna units that a tower traditionally supports has increased and is expected to continue to increase. New towers will need to be designed to support greater numbers of antenna and radio units, while existing towers are retrofitted to support more units, and effort is made to fully utilize space available on the towers.

When mounting antennas to towers or other structures, the cables attaching the radio to the antenna typically protrude from the bottom of the antenna for some unsupported length. It is typically desirable to secure these cables to maintain a sense of organization and to prevent swaying in the wind. A system of cable support brackets is commonly used to hold these cables in place. Those support systems usually also mount to the same mounting structure to which the antenna is mounted (e.g., an individual pole of an antenna mount or a monopole).

Areas near cellular antennas (i.e., within 1λ, or one wavelength) can be (relatively) high radio frequency (RF) energy environments. Conductive items in these areas, such as hangers, brackets and other hardware, can generate undesirable passive intermodulation (PIM). Typical examples of potential PIM-generating conditions include the combination of steel-on-steel contact (between two or more components), plus low contact pressure and/or relative movement between the steel components at the joint. As such, it may be desirable to provide solutions near an antenna with reduced (or eliminated) likelihood of PIM generation.

SUMMARY

A first aspect of the present invention is directed to a cable support bracket. The cable support bracket may comprise a base configured to be mounted to an antenna, the base comprising a plurality of apertures, each aperture configured to receive a cable hanger; a cable guide having a generally arced outer profile, wherein the cable guide is coupled to or integral with the base and extends outwardly from one end of the base; and a plurality of cable hangers, each cable hanger secured in a respective aperture in the base.

Another aspect of the present invention is directed to a cable support bracket. The cable support bracket may comprise a base configured to be mounted to an antenna and configured to receive and secure a first plurality of cable hangers; a bridge removably attached to the base, the bridge configured to receive and secure a second plurality of cable hangers; and a cable guide having a generally arced outer profile, wherein the cable guide is coupled to or integral with the base and extends outwardly from one end of the base.

Another aspect of the present invention is directed to an antenna assembly. The antenna assembly may comprise an antenna; and a cable support bracket, the cable support bracket comprising: a base configured to be mounted to the antenna, the base comprising a plurality of apertures, each aperture configured to receive a cable hanger; a cable guide having a generally arced outer profile, wherein the cable guide is coupled to or integral with the base and extends outwardly from one end of the base; and a plurality of cable hangers, each cable hanger secured in a respective aperture in the base, wherein the cable support bracket is mounted to the antenna.

Another aspect of the present invention is directed to an antenna assembly in combination with a plurality of cables. The antenna assembly may comprise an antenna; and a cable support bracket, the support bracket comprising: a base configured to be mounted to an antenna, the base comprising a plurality of apertures, each aperture configured to receive a cable hanger; a cable guide having a generally arced outer profile, wherein the cable guide is coupled to or integral with the base and extends outwardly from one end of the base; and a plurality of cable hangers, each cable hanger secured in a respective aperture in the base, wherein the cable support bracket is mounted to the antenna, and wherein at least one of the plurality of cables is secured within at least one of the plurality of cable hangers.

Another aspect of the present invention is directed to a method for organizing coaxial cable connections at a base station antenna. The method may comprise providing a cable support bracket, the support bracket comprising: a base configured to be mounted to an antenna, the base comprising a plurality of apertures, each aperture configured to receive a cable hanger; a cable guide having a generally arced outer surface, wherein the cable guide is coupled to or integral with the base and extends outwardly from one end of the base; and a plurality of cable hangers, each cable hanger secured in a respective aperture in the base; mounting the cable support bracket to an antenna having a plurality of connection ports such that each cable hanger aligns with a respective connection port; connecting a plurality of coaxial cables to the plurality of connection ports, wherein each coaxial cable is connected to a respective connection port; and securing each coaxial cable to a respective cable hanger.

Another aspect of the present invention is directed to a method for organizing coaxial cable connections at a base station antenna. The method may comprise providing a cable support bracket, the support bracket comprising: a base configured to be mounted to an antenna and configured to receive and secure a first plurality of cable hangers; a bridge removably attached to the base, the bridge configured to receive and secure a second plurality of cable hangers; and a cable guide having a generally arced outer profile, wherein the cable guide is coupled to or integral with the base and extends outwardly from one end of the base; mounting the cable support bracket to an antenna having a plurality of connection ports such that each cable hanger aligns with a respective connection port; connecting a plurality of coaxial cables to the plurality of connection ports, wherein each coaxial cable is connected to a respective connection port; and securing each coaxial cable to a respective cable hanger.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1:
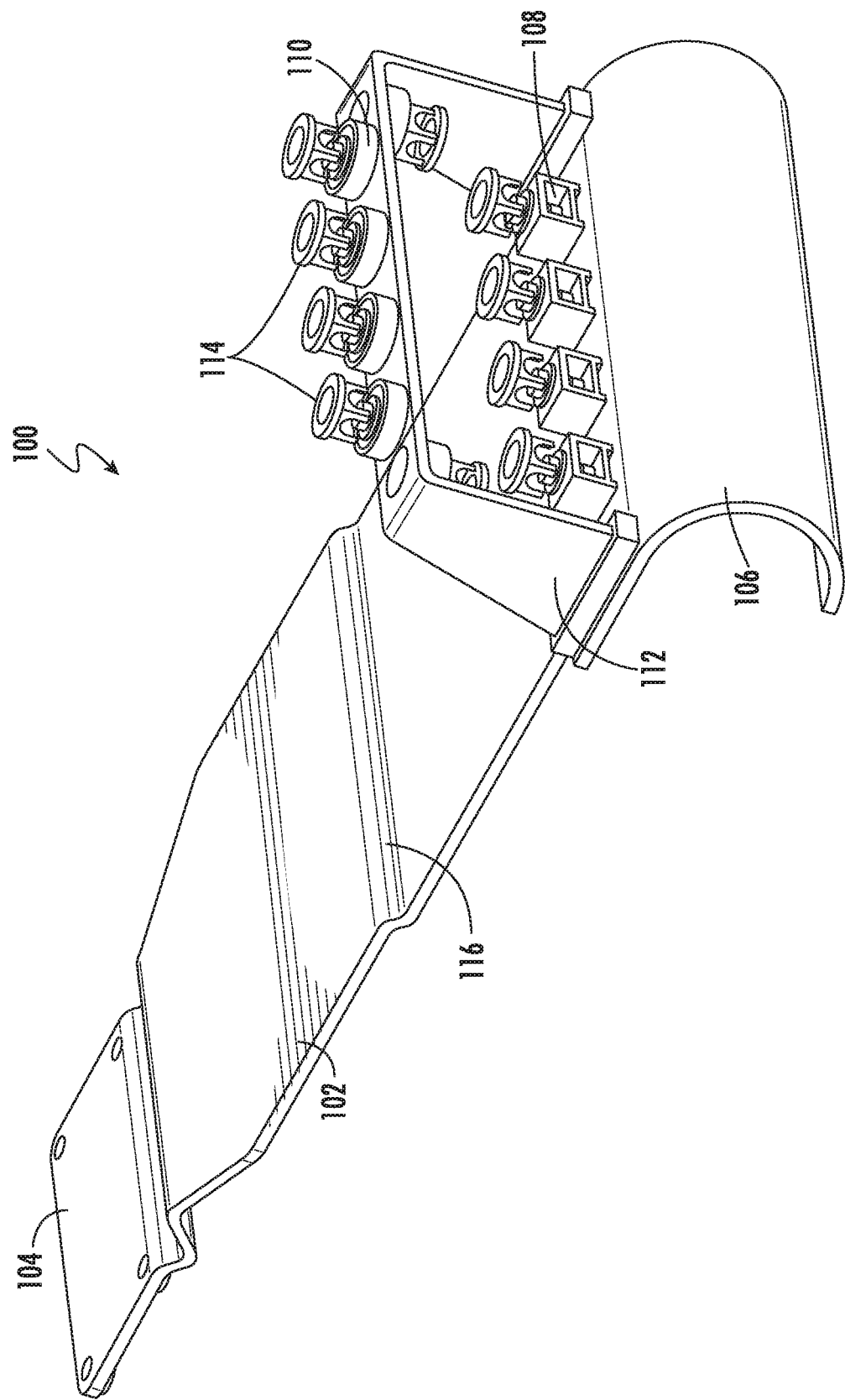
FIG. 1 is a side perspective view of a cable support bracket according to embodiments of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention now will be described more fully hereinafter with reference to the accompanying drawings, in which illustrative embodiments of the invention are shown.

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Embodiments of the present invention are directed to cable support brackets and assemblies which may greatly reduce passive intermodulation (PIM) and provide for easy identification of coaxial cables connected to an antenna. In some embodiments, a cable support bracket of the present invention may provide optimized and predetermined coaxial support locations for coaxial cable connections at a base station antenna. In some embodiments, a cable support bracket of the present invention may mitigate PIM caused by bends in a coaxial cable that are that are too close to the connector body. In some embodiments, a cable support bracket of the present invention may provide an integrated cable bend radius guide that helps maintain the minimum bend radius requirements of a coaxial cable. In some embodiments, a cable support bracket of the present invention may be fabricated from a non-conductive polymer-based material which may help to mitigate PIM. In some embodiments, a cable support bracket of the present invention may provide for easy identification of organized coaxial cables attached to an antenna. In some embodiments, a cable support bracket of the present invention may be integrated into an existing antenna structure or as a separate accessory. In some embodiments, a cable support bracket of the present invention may be integrated for use with polymer-based cable hangers. In some embodiments, a cable support bracket of the present invention may be slotted or provided with holes to help reduce exposure to wind drag.

Referring now to the figures, a cable support bracket 100 according to some embodiments of the present invention is illustrated in FIGS. 1-13. As will be discussed in further detail below, the cable support bracket 100 of the present invention may comprise a base 102 and a cable guide 106. In some embodiment, the base 102 of the cable support bracket 100 may be configured to receive and secure a plurality of cable hangers 114. In some embodiments, the cable support bracket 100 may further comprise a bridge 112.

Figure 2:
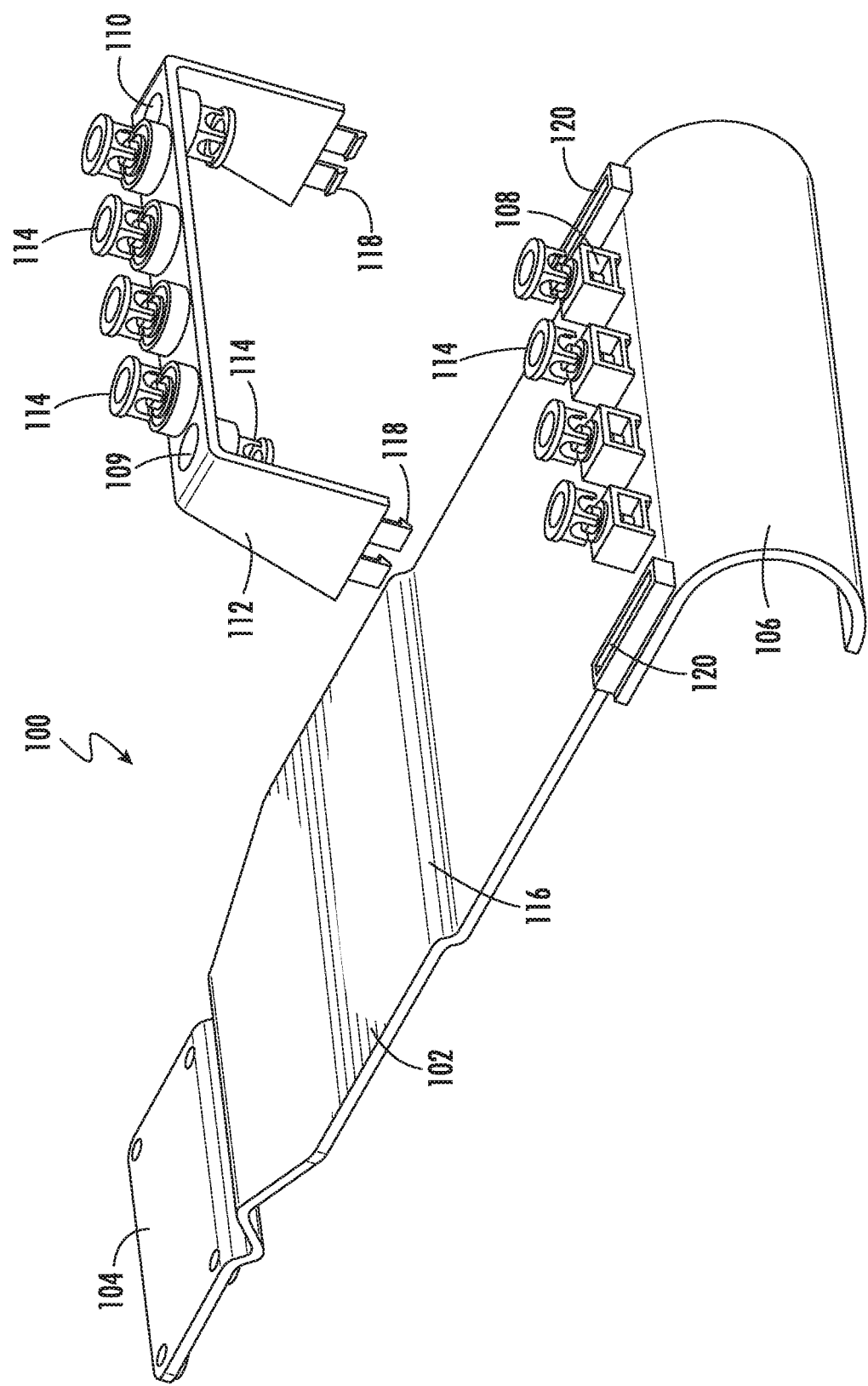
FIG. 2 is a side perspective exploded view of the cable support bracket of FIG. 1.
Figure 3:
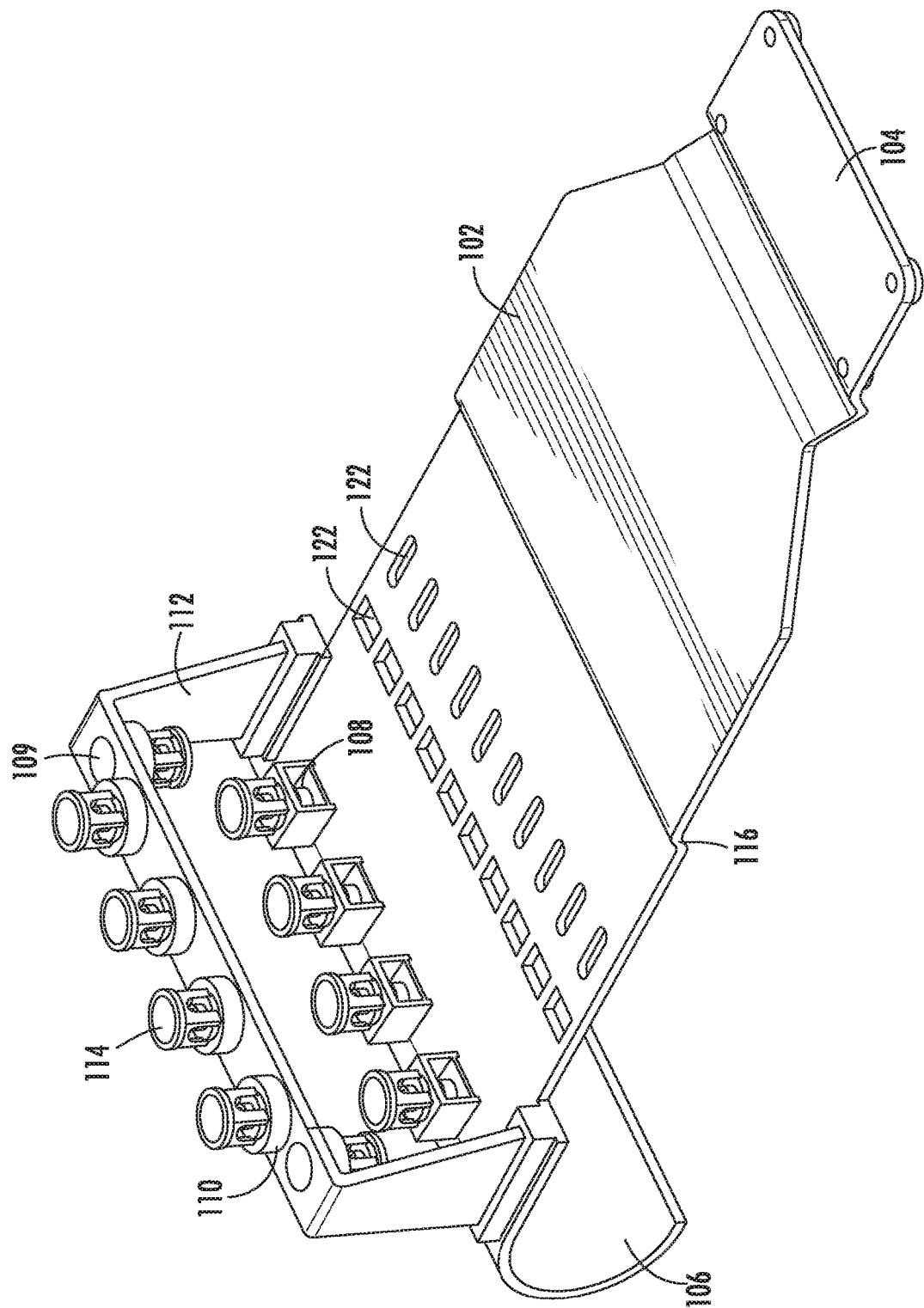
FIG. 3 is a front perspective view of a cable support bracket according to alternative embodiments of the present invention.
Figure 4:
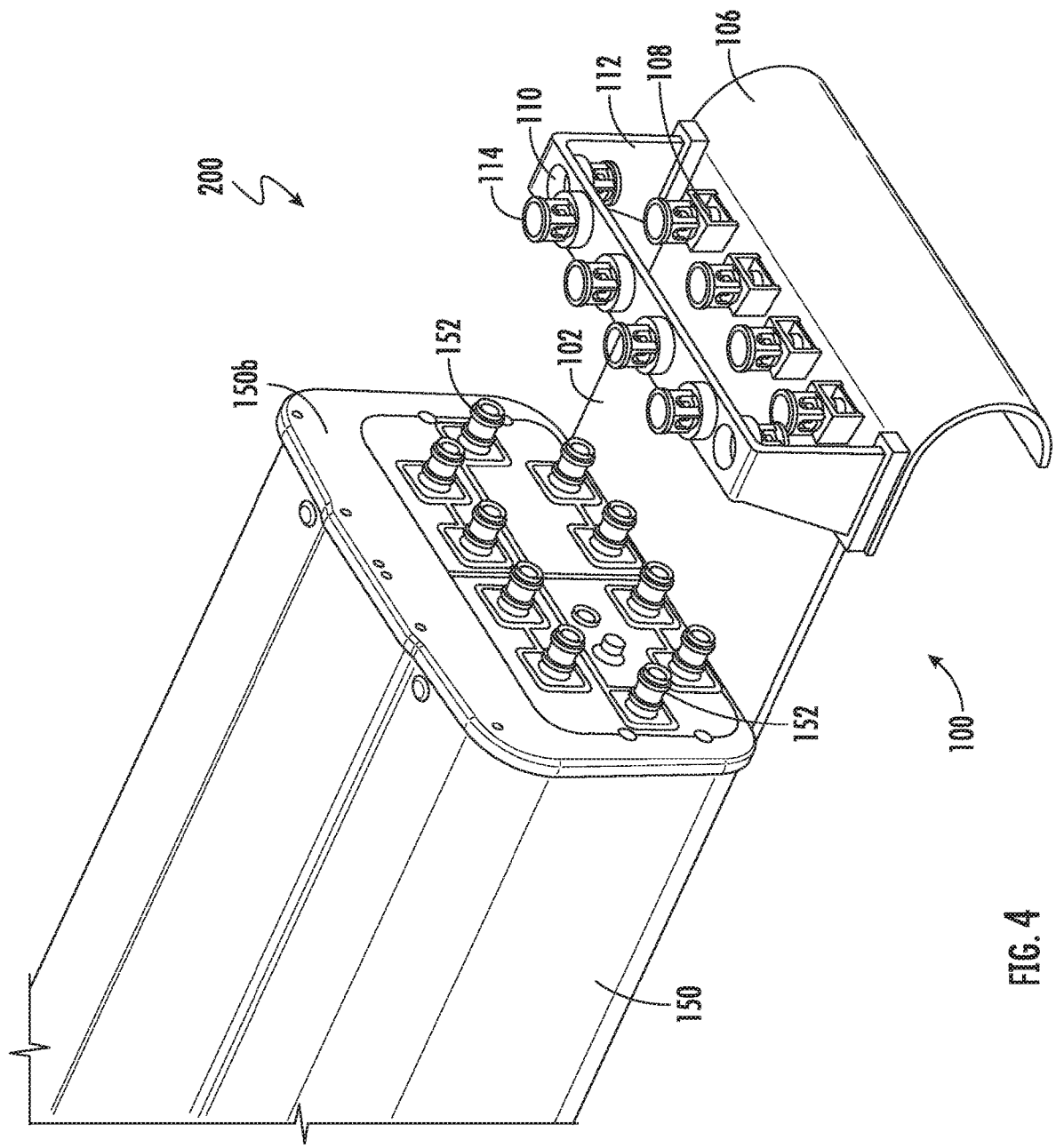
FIG. 4 is a side perspective view of the cable support bracket of FIG. 1 attached to an antenna to form an antenna assembly.
Figure 5:
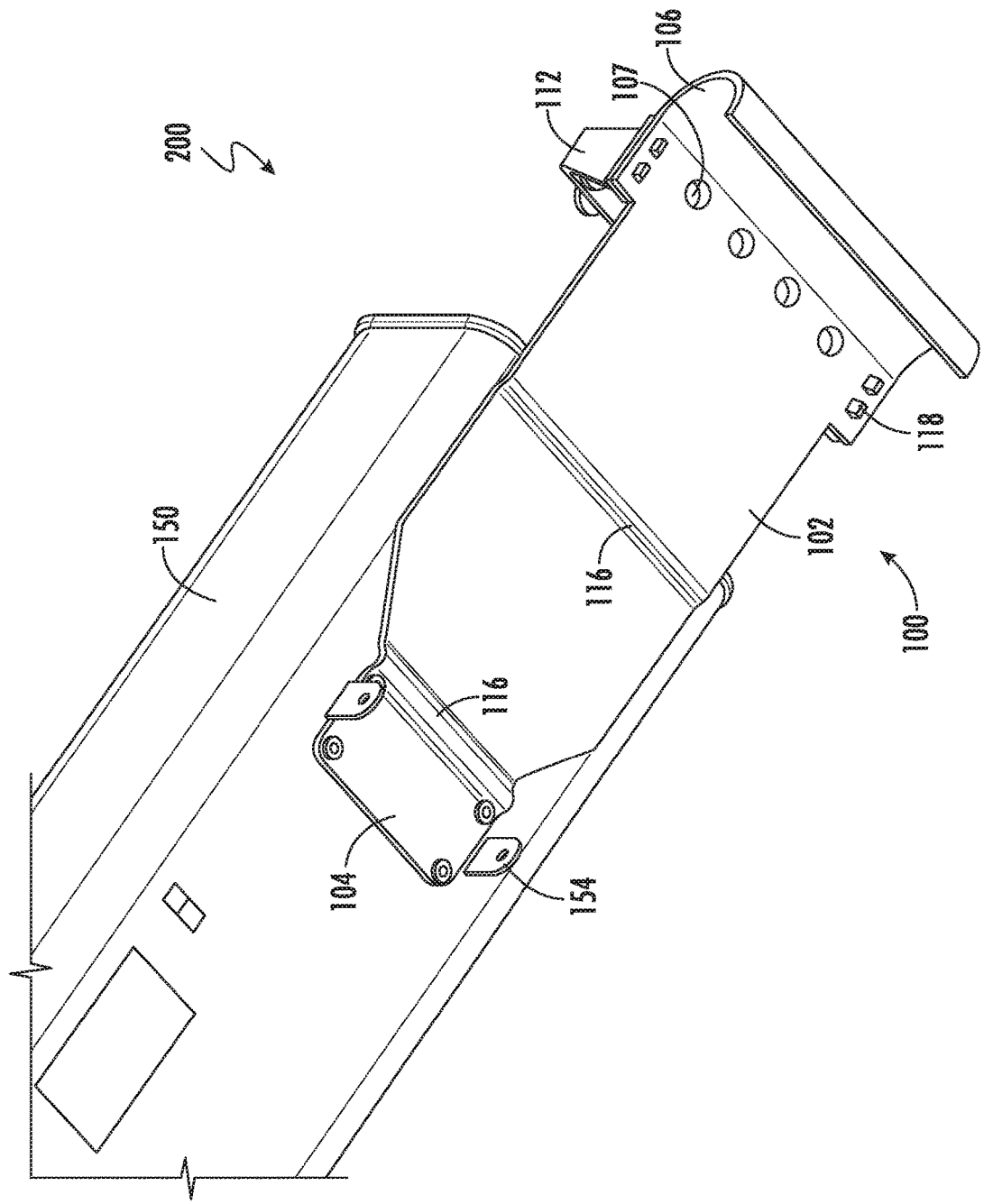
FIG. 5 is a rear perspective view of the antenna assembly of FIG. 4.

Referring to FIGS. 1-3, the cable support bracket 100 of the present invention comprises a base 102. In some embodiments, the base 102 is configured to be mounted to an antenna 150 (see, e.g., FIG. 5). In some embodiments, the base 102 may comprise a mounting plate 104 to assist in mounting the cable support bracket 100 to the antenna 150. The mounting plate 104 may be coupled to or integral with the base 102. In some embodiments, the base 102 (and/or mounting plate 104) may be configured such that it can be secured to a pre-existing mounting bracket 154 on an antenna 150 (see, e.g., FIG. 5). In some embodiments, the antenna 150 is a base station antenna. Other methods may be employed to secure or provide additional support to a bracket 100 being mounted to an antenna 150, such as, for example, elastomeric bands, adhesives, or the like.

In some embodiments, the cable support bracket 100 is formed of a non-metallic and/or polymeric material. For example, in some embodiments, the cable support bracket 100 comprises acetal, nylon, polypropylene, polyvinyl chloride, and/or fiberglass. In some embodiments, the base 102 of the cable support bracket 100 may comprise one or more ridges 116. The ridge(s) 116 may provide additional structural support and/or stiffness to the cable support bracket 100 when the bracket 100 is mounted to an antenna 150.

Still referring to FIGS. 1-3, in some embodiments, the cable support bracket 100 further comprises a plurality of cable hangers 114. For example, the cable support bracket 100 may comprise 1, 2, 3, 4 or more cable hangers 114. As discussed below, typically the number of cable hangers 114 is equal to the number of connection ports 152 at the bottom 150b of an antenna 150. For example, as shown in FIGS. 1-3, in some embodiments, the cable support bracket 100 may comprise ten (10) cable hangers 114.

Figure 10:
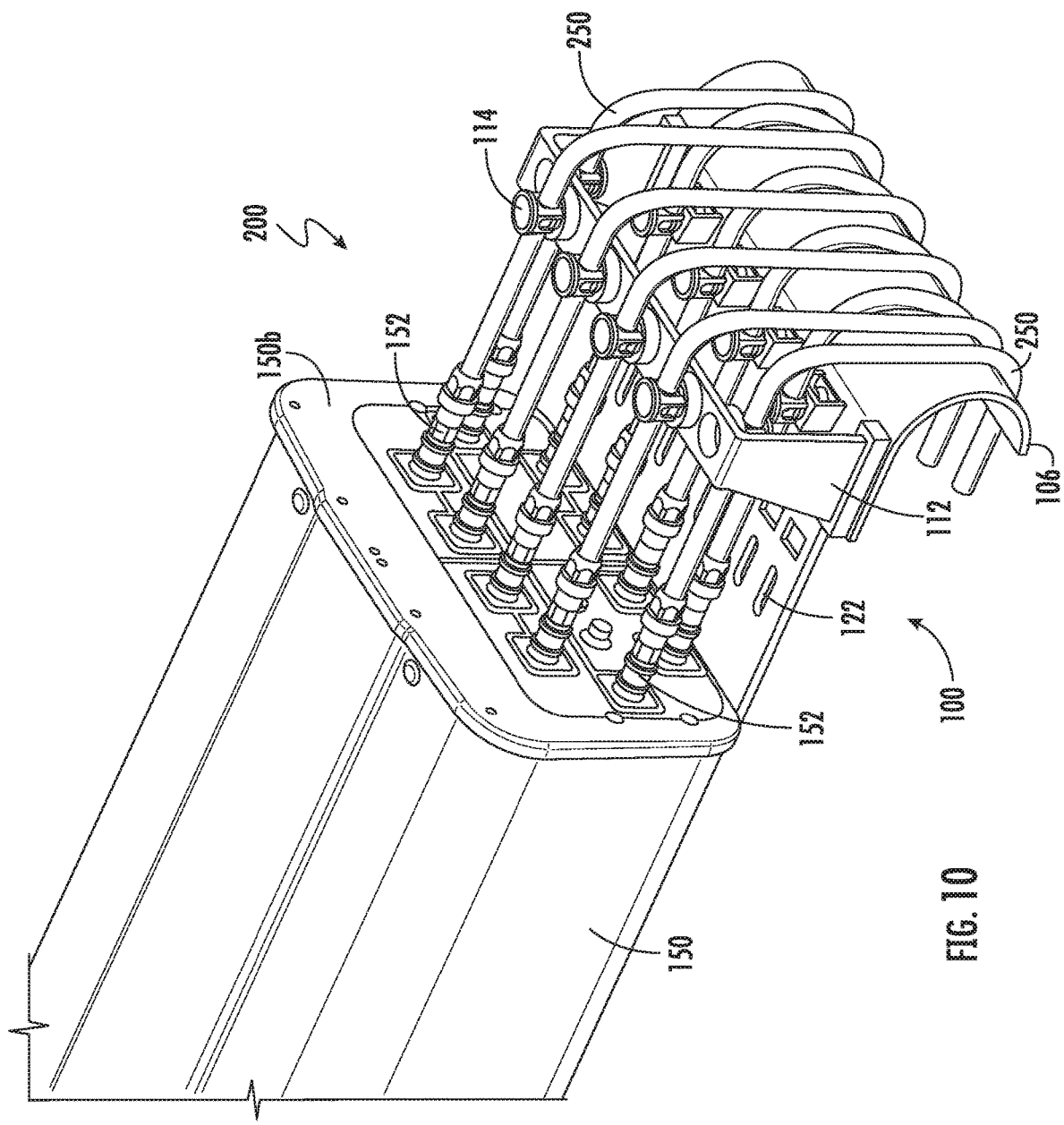
FIG. 10 is a side perspective view of the antenna assembly utilizing the cable support bracket of FIG. 3 in combination with coaxial cables according to embodiments of the present invention.
Figure 11:
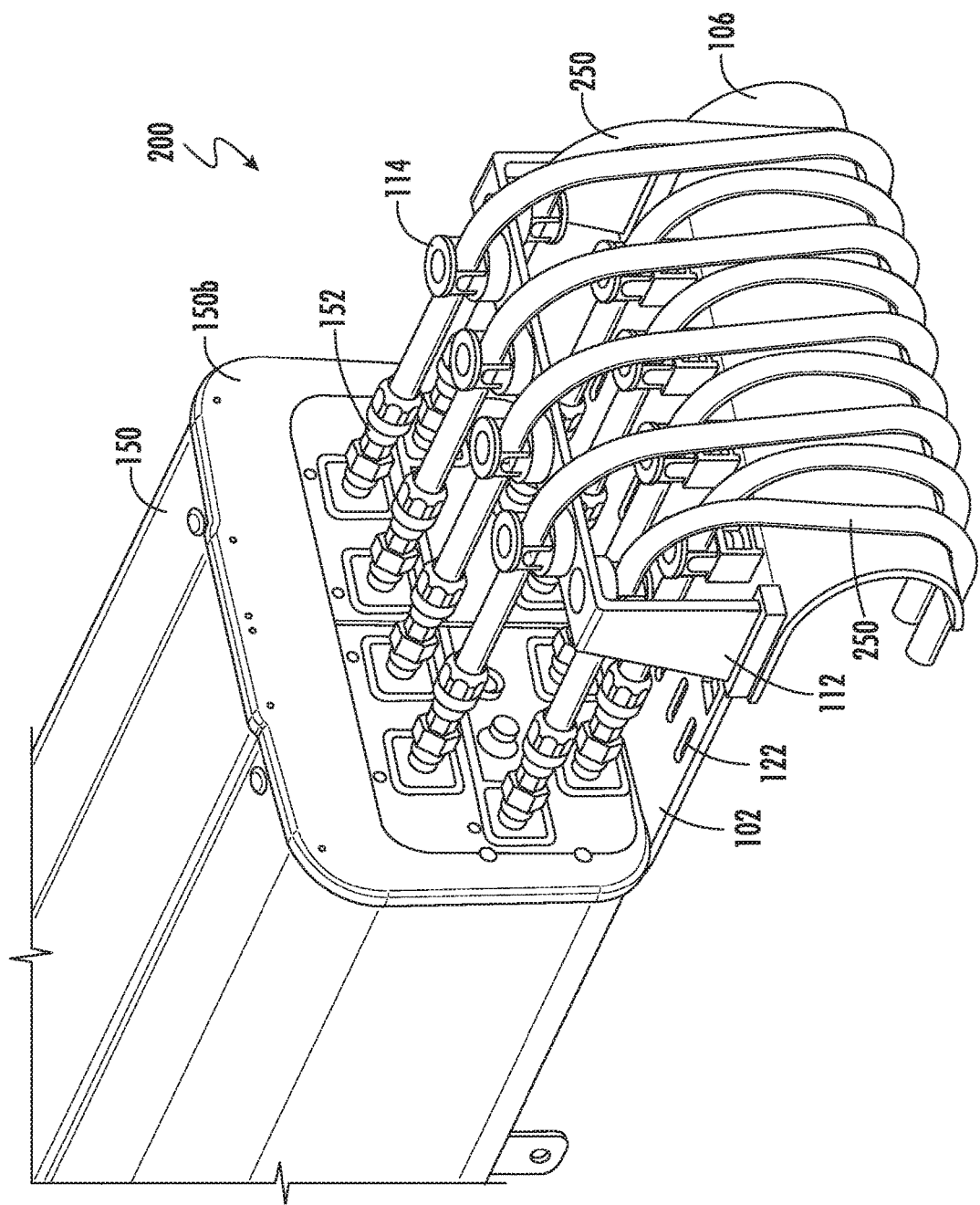
FIG. 11 is a side perspective view of the antenna assembly and cables of FIG. 10.
Figure 12:
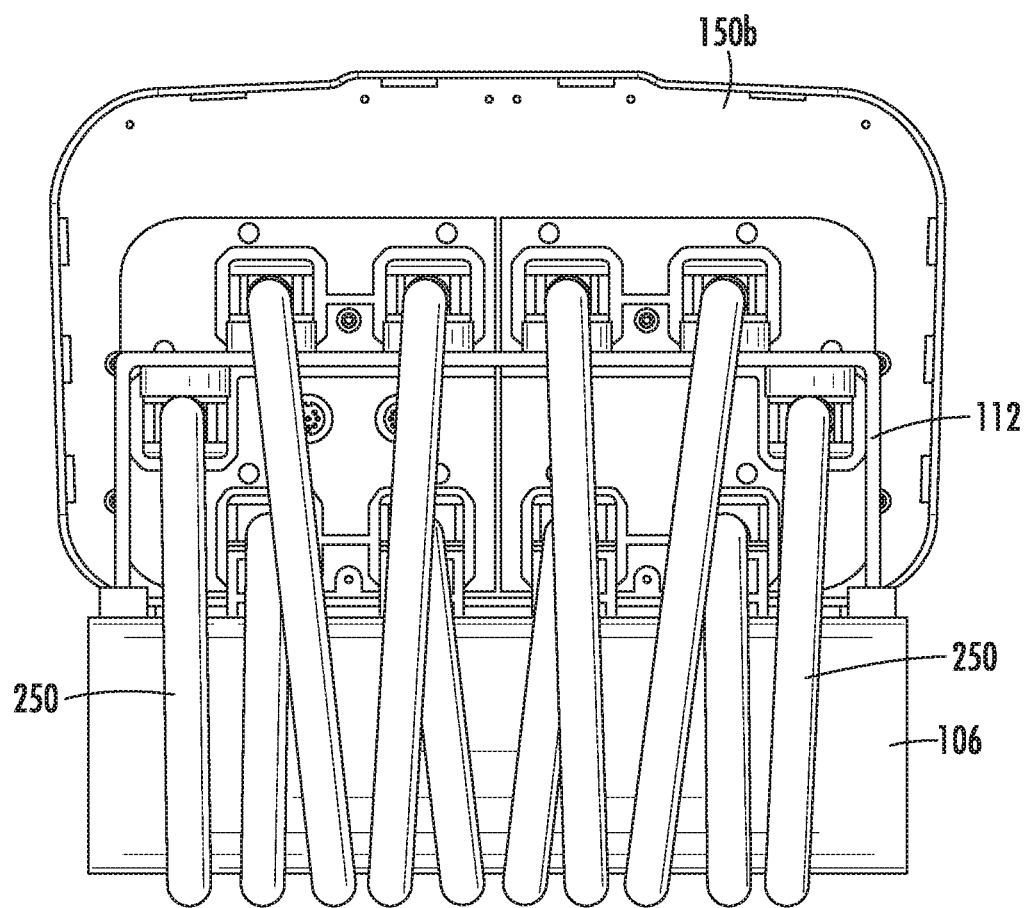
FIG. 12 is a bottom view of the antenna assembly and cables of FIG. 10.

Each cable hanger 114 is configured to hold and secure a respective coaxial cable 250 when the cable 250 is connected to an antenna 150 (see, e.g., FIGS. 10-12). In some embodiments, the cable hangers 114 may be attached to the base 102 of the cable support bracket 100. For example, in some embodiments, the base 102 may comprise a plurality of apertures 107. Each aperture 107 may be configured to receive and secure a respective cable hanger 114 to the base 102 (see, e.g., FIG. 5). In some embodiments, the apertures 107 have a diameter in the range of 0.5 inches to 1 inch. For example, in some embodiments, the apertures 107 have a nominal diameter of 0.75 inches. In some embodiments, the cable hangers 114 have a height ($H_{ch}$) in a range of about 0.5 inches to about 1.5 inches (see, e.g., FIG. 9). Exemplary types of cable hangers 114 that may be used with a cable support bracket 100 of the present invention include, but are not limited to, SSH-114-1 and SSH-1014-1 available from CommScope, Inc. (Joliet, Illinois). See also, e.g., United States Patent Application Publication No. 2018/0045336 to Vaccaro, which is incorporated herein by reference in its entirety.

In some embodiments, the base 102 of the cable support bracket 100 may comprise a plurality of base support platforms 108. Each base support platform 108 may be configured to receive and secure a cable hanger 114. In some embodiments, each aperture 107 may configured to receive and secure a respective base support platform 108 to the base 102. For example, in some embodiments, the base support platforms 108 may be attached to the base 102 of the cable support bracket 100 via the apertures 107 and each cable hanger 114 is attached to a respective base support platform 108. Exemplary types of base support platforms 108 that may be used with a cable support bracket 100 of the present invention include, but are not limited to, SA-1C-1F and SA-1TR available from CommScope, Inc. (Joliet, Illinois). As discussed in further detail below, the base support platforms 108 assist with aligning each of the cable hangers 114 with a respective connection port 152 located at the bottom 150b of an antenna 150 (see, e.g., FIG. 6).

In some embodiments, the plurality of base support platforms 108 are formed of a non-metallic and/or polymeric material, such as, for example, nylon, acetal, polypropylene, or polyethylene. In some embodiments, each base standoff platform 108 has a height ($H_{b1}$) in a range of about 0.5 inches to about 1.5 inches. The height ($H_{b1}$) of the base standoff platform 108 has the potential of being increased depending on the antenna type and connector locations on the antenna.

As mentioned above, the cable support bracket 100 further comprises a cable guide 106. The cable guide (or cable bend radius guide) 106 may be coupled to or integral with the base 102 of the bracket 100 and extends outwardly from one end of the base 102. In some embodiments, the base 102 and the cable guide 106 may be a unitary member. The cable guide 106 may have a generally arced outer profile (see also, e.g., FIG. 9). For example, in some embodiments, the cable guide 106 has a radius (R) of about 2 inches or greater, and may extend over an arc distance of at least 90 degrees, and in some cases, at least 120 degrees. Coaxial cables 250 have minimum bend radius requirements. Bends in a coaxial cable 250 may damage the cable and/or cause unwanted passive intermodulation (PIM). The cable guide 106 of the present invention helps to maintain the minimum bend radius requirements of a coaxial cable 250 when the cable 250 is connected to an antenna 150, thereby helping to reduce unwanted PIM near the antenna 150 (see, e.g., FIGS. 10-12).

The cable support bracket 100 of the present invention has a length (L) and a width (W). The length (L) and width (W) of the bracket 100 may vary depending on the type of antenna 150 that the bracket 100 is being mounted and/or the number of connection ports 152 at the bottom 150b of the antenna 150 (see, e.g., FIG. 8). For example, in some embodiments, the cable support bracket 100 has a length (L) in a range of about 20 inches to about 30 inches and a width (W) in a range of about 10 inches to about 36 inches. In some embodiments, the cable guide 106 may have greater width (W) than the base 102 of the cable support bracket 100 (see, e.g., FIG. 7 and FIG. 8). In some embodiments, the bracket 100 of the present invention may be sized to fit an antenna 150 having two (2) connection ports 152 to an antenna 150 having fifty (50) or more connection ports 152.

Still referring to FIGS. 1-3, in some embodiments, the cable support bracket 100 may further comprise a bridge 112. The bridge 112 may be removably attached to the base 102. For example, as shown in FIG. 2, the bridge 112 may comprise one or more latching members 118. The base 102 of the bracket 100 may comprise slots 120 configured to receive the latching members 118 of the bridge 112. When inserted into the slots 120, the latching members 118 secure the bridge 112 to the base 102. In some embodiments, the bridge 112 may be integral with the base 102, such that the bridge 112 and the base 102 comprise a unitary member.

As shown in FIGS. 1-3, the bridge 112 may comprise a plurality of bridge standoff platforms 110. The bridge standoff platforms 110 may be coupled to or integral with the bridge 112. Each bridge standoff platform 110 has a height ($H_{b2}$) and is configured to receive a cable hanger 114 (see also, e.g., FIG. 9). In some embodiments, a cable hanger 114 is secured in a respective bridge standoff platform 110. In some embodiments, each bridge standoff platform 110 has a height ($H_{b2}$) in a range of about 0.5 inches to about 1.5 inches. The height ($H_{b2}$) of the bridge standoff platform 110 has the potential of being increased based on antenna connector layouts. Similar to the base 102, in some embodiments, the bridge 112 may comprise a plurality of apertures 109 configured to receive and secure a respective cable hanger 114 to the bridge 102 (see, e.g., FIG. 3).

In some embodiments, the height ($H_{b2}$) of each bridge standoff platform 110 may be adjustable to allow the proper alignment of a cable hanger 114 with a connection port 152 of an antenna 150. For example, in some embodiments, each bridge standoff platform 110 may comprise threads where turning the platform 110 clockwise or counterclockwise will raise or lower the platform 110 to a desirable height ($H_{b2}$) above the top of the bridge 112.

In some embodiments, the bridge 112 is attached to the base 102 such that the bridge standoff platforms 110 (and cable hangers 114 attached to the bridge standoff platforms 110) reside above the base standoff platforms 108 (and the cable hangers 114 attached to the base standoff platforms 108). For example, as shown in FIGS. 1-4 and FIGS. 10-12, the cable hangers 114 attached to the bridge 112 reside directly above the cable hangers 114 attached to the base 102.

The bridge 112 should have a sufficient height ($H_b$) such that the cable hangers 114 attached to the bridge 112 align with an upper row of connection ports 152. The bridge 112 should also have a sufficient height ($H_b$) above the cable hangers 114 secured to the base 102 (or in a base standoff platform 108) such that the bridge 112 does not contact the cable hangers 114 secured to the base 102 (or base standoff platforms 108). A sufficient height ($H_b$) of the bridge 112 also allows for enough space for easy installation and identification of coaxial cables 250 by a technician (see also, e.g., FIG. 12). For example, in some embodiments, the bridge 112 has a height ($H_b$) relative to the base 102 in the range of about 3 inches to about 6 inches. The height ($H_b$) of the bridge 112 can vary based on antenna design and has the potential to be increased based on the type of antenna.

In some embodiments, the height ($H_b$) of the bridge 112 may be adjustable. For example, in some embodiments, each side of the bridge 112 may comprise a telescoping member that allows the bridge 112 to be raised and lowered to a desirable height ($H_b$).

In some embodiments, in place of the base support platforms 108 and/or the bridge 112, one or more cable hangers 114 may be stacked on top of one another to align one or more cable hangers 114 with one or more connection ports 152. For example, three cable hangers 114 may be stacked on top of one another such that the bottom and top cable hangers 114 in the stack each align with a respective connection port 152.

Referring to FIG. 3, in some embodiments, the base 102 of the cable support bracket 100 may further comprise slots (or holes) 122. The slots 122 may be included to reduce the exposure area of the cable support bracket 100, thereby mitigating wind drag on the cable support bracket 100. The slots 122 may vary in number, shape and/or size.

Referring now to FIGS. 4-8, an antenna assembly 200 according to some embodiments of the present invention is illustrated. As shown in FIGS. 4-8, a cable support bracket 100 as described herein is mounted to an antenna 150. The base 102 of the cable support bracket 100 is secured to the antenna 150 by a mounting plate 104 (see, e.g., FIG. 5). The mounting plate 104 is configured such that it can be secured to a pre-existing mounting bracket 154 on the antenna 150.

Figure 6:
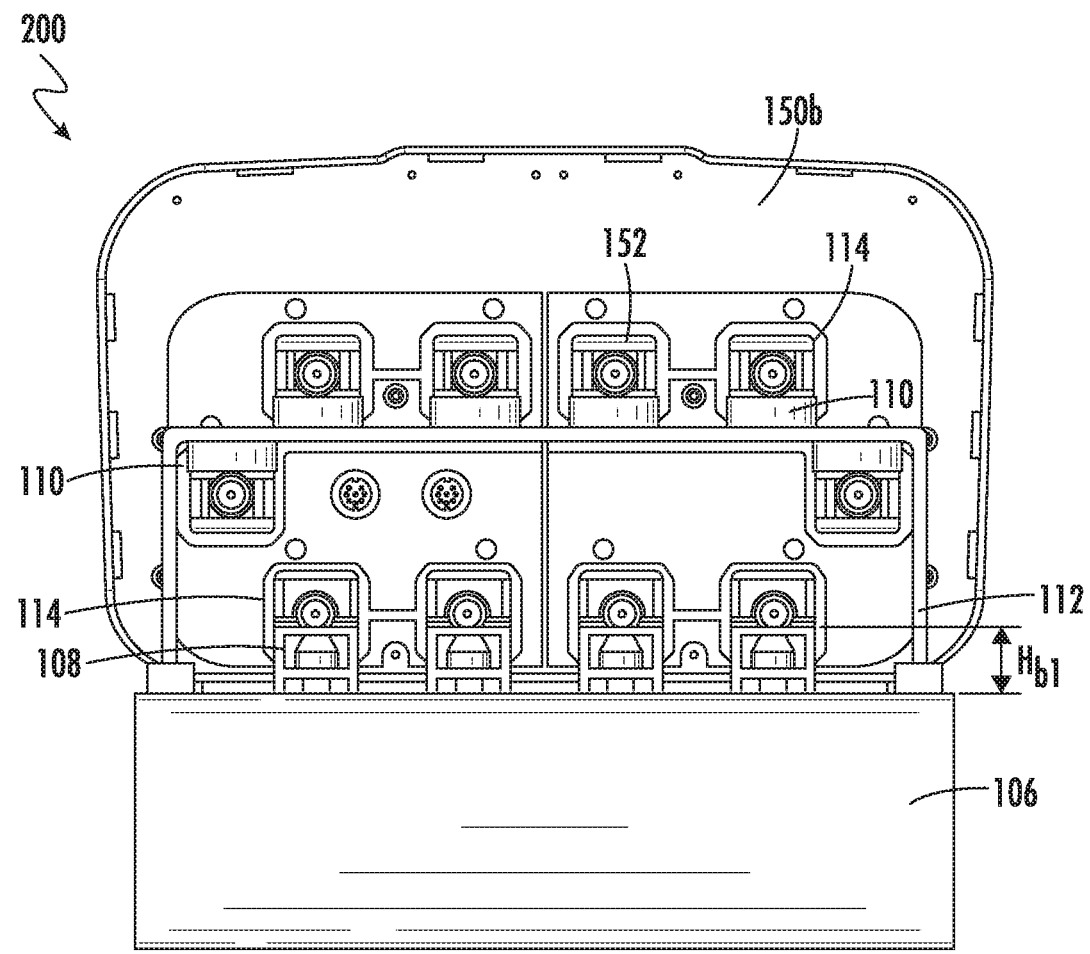
FIG. 6 is a bottom view of the antenna assembly of FIG. 4.

Referring to FIG. 6, the cable support bracket 100 aligns the cable hangers 114 with the connection ports 152 of the antenna 150. Aligning the cable hangers 114 with the connection ports 152 helps to prevent or reduce bending the coaxial cables 250 when secured within the cable hangers 114. Thus, the cable support bracket 100 helps to mitigate PIM caused by bends of the coaxial cable that are that are too close to the connector body that terminates the cable. In some embodiments, the cable support bracket 100 may be color-coded to match with the connection ports 152 of an antenna 150 allowing for easy installation and organization of the cables 250 by a technician (see also, e.g., FIGS. 10-12).

As shown in FIG. 6, the cable support bracket 100 has ten cable hangers 114 to match the ten connection ports 152 of the antenna 150 (see, e.g., four cable hangers 114 are attached to the base 102 and six cable hangers 114 are attached to the bridge 112). Note that two of the cable hangers 114 are attached to the bottom of the bridge 112 in order to properly align with two of the connection ports 152 on the antenna 150. The arrangement of cable hangers 114 on the base 102 and/or bridge 112 may vary depending on how the connection ports 152 are arranged on an antenna 150. The cable support brackets 100 of the present invention can be modified to match different arrangements of connection ports 152 on different antennas 150.

Figure 7:
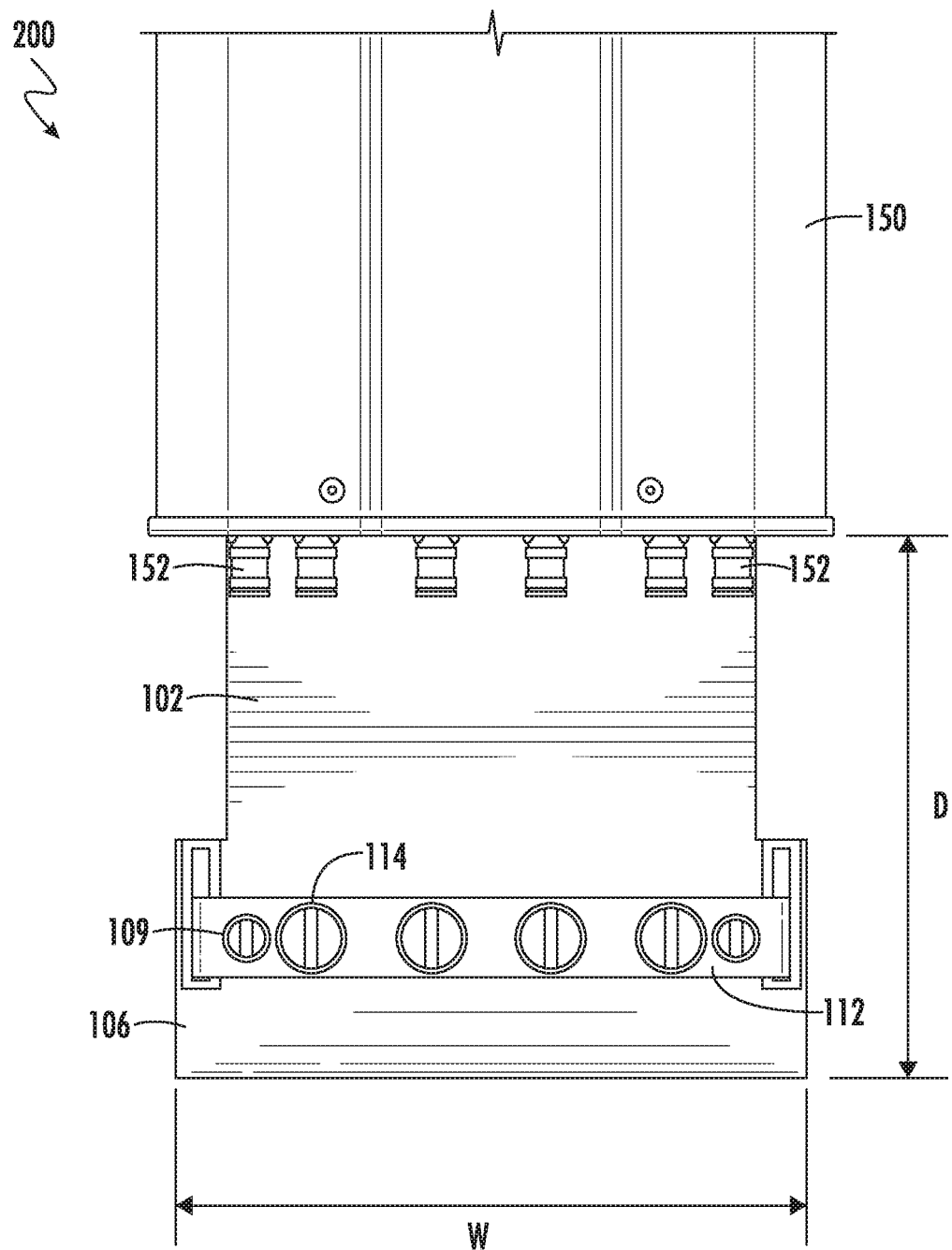
FIG. 7 is a front view of the antenna assembly of FIG. 4.
Figure 8:
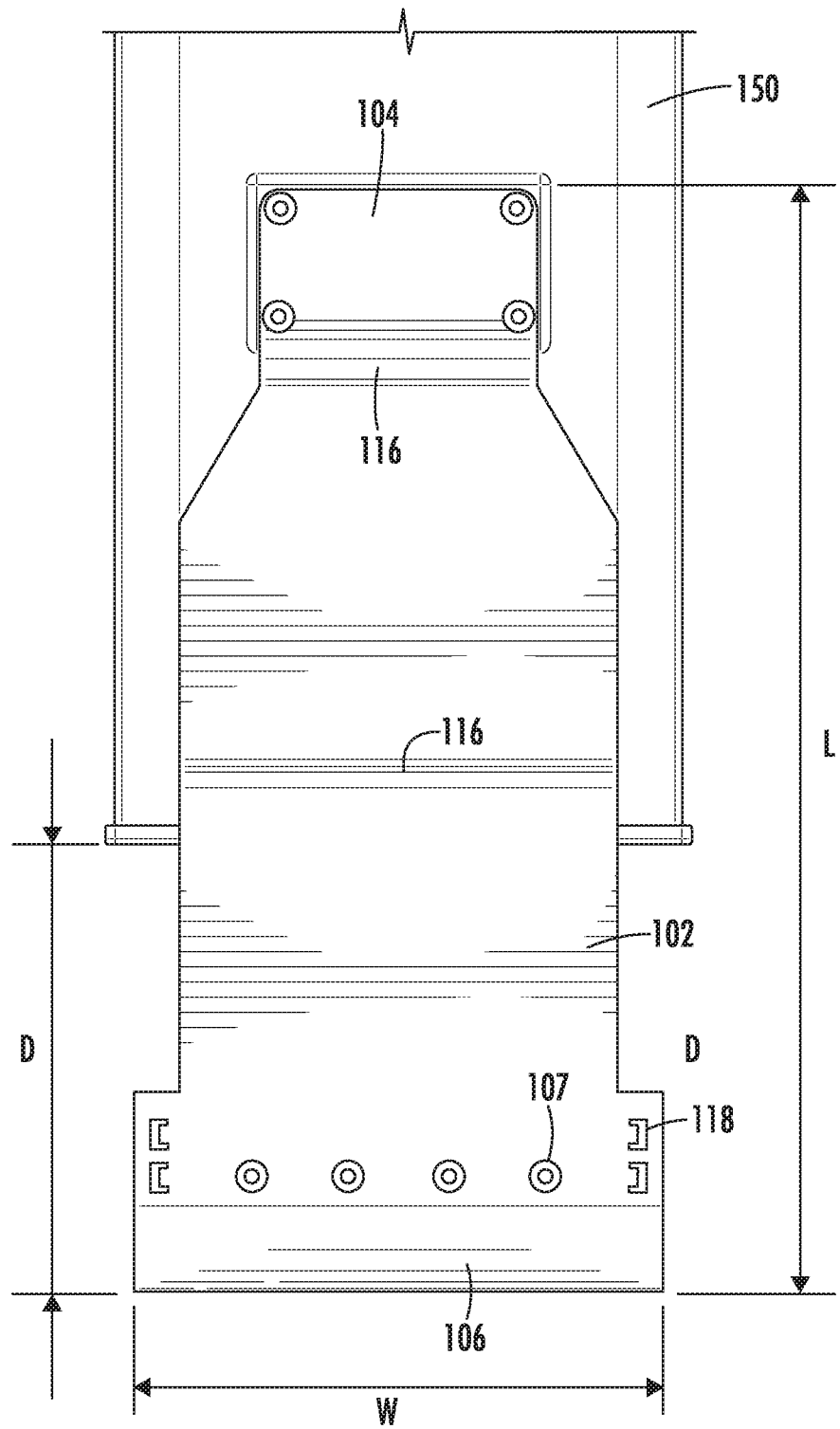
FIG. 8 is a rear view of the antenna assembly of FIG. 4.
Figure 9:
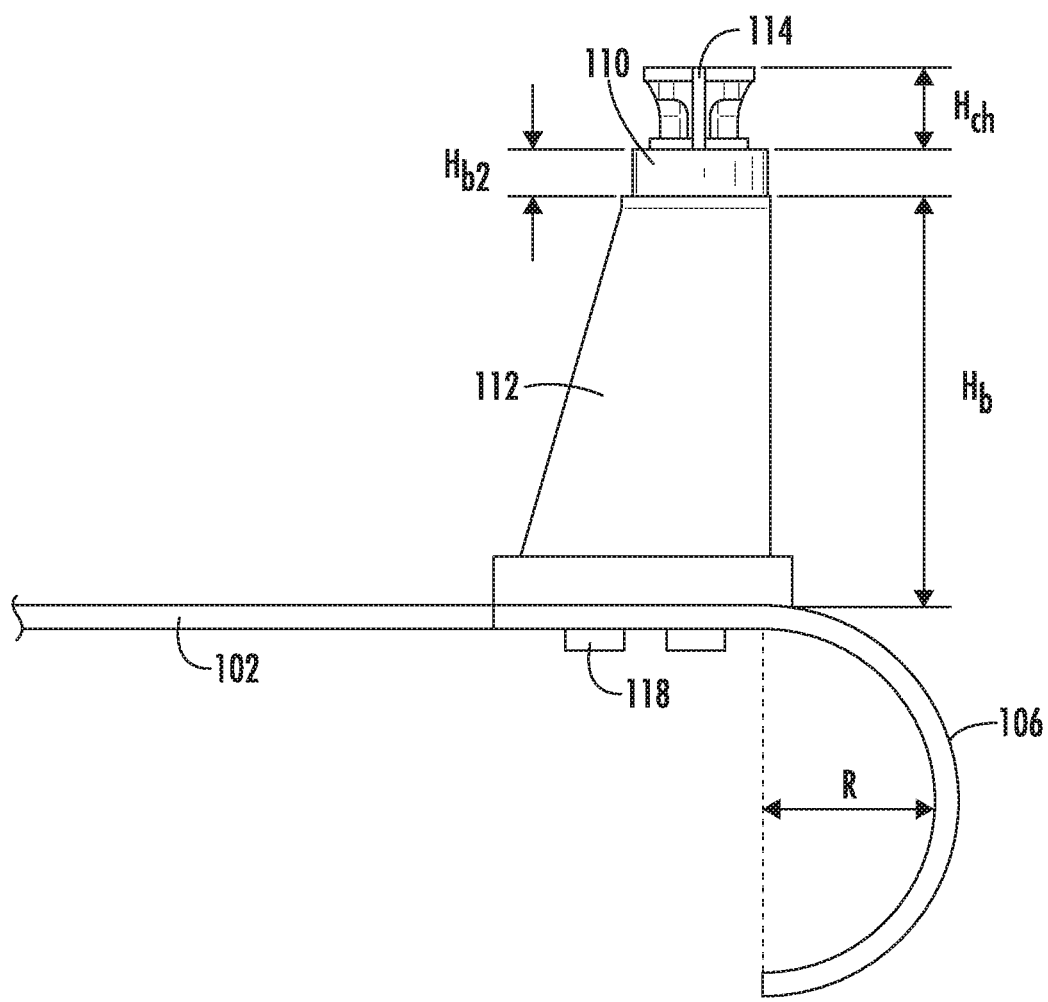
FIG. 9 is a side view of the cable support bracket of FIG. 1.

As stated above, it is undesirable to bend a coaxial cable 250 close to its connection with an antenna 150. Bending a coaxial cable 250 too close to the connection port 152 may damage the coaxial cable 250 and/or may be a source of unwanted PIM. Industry standards for support before the first bend of a coaxial cable 250 vary from operator to operator. For example, typical industry standards provide that coaxial cables 250 should not bend within six inches from the connection port 152. As shown in FIG. 7 and FIG. 8 (see also, FIGS. 10-12), the cable support bracket 100 of the present invention is attached to an antenna 150 such that the cable guide 106 and cable hangers 114 are a sufficient distance (D) from the bottom 150b (and connection ports 152) of the antenna 150. Note that it is also desirable that the cable hangers 114 (and cable guide 106) are not too far from the bottom 150b and connection ports 152 of the antenna 150. The farther away the cable hangers 114 are from the connection ports 152, the greater the length of cable 250 extending between the connection ports 152 and cable hangers 114 that is exposed to wind. This could lead to damage to and/or loosening of the connection between the cables 250 and the antenna 150, and/or can add to the wind load of the antenna assembly 200. In some embodiments, the cable hangers 114 and/or cable guide 106 are at distance from the bottom 150*b* of an antenna 150 in a range of about 9 inches to about 13 inches.

Referring now to FIGS. 10-12, illustrated is an antenna assembly 200, in combination with a plurality of coaxial cables 250, according to embodiments of the present invention. Each of the cables 250 are connected to a respective connection port 152 located at the bottom 150*b* of an antenna 150. The cable support bracket 100 of the present invention aligns the cable hangers 114 with the connection ports 152 to provide optimized and predetermined coaxial support for the coaxial cable connections at the antenna 150. The cable support bracket 100 helps keep the coaxial cables 250 straight near the connection ports 152. Reducing bends in the coaxial cables 250 that are too close to the connector body help to mitigate PIM. The cable guide 106 helps to maintain the minimum bend radius requirements of the coaxial cables 250, thereby also helping to reduce unwanted PIM near the antenna 150. As shown in FIG. 12, the cable support bracket 100 of the present invention may provide for easy identification of organized coaxial cables 250 attached to the antenna 150.

Figure 13:
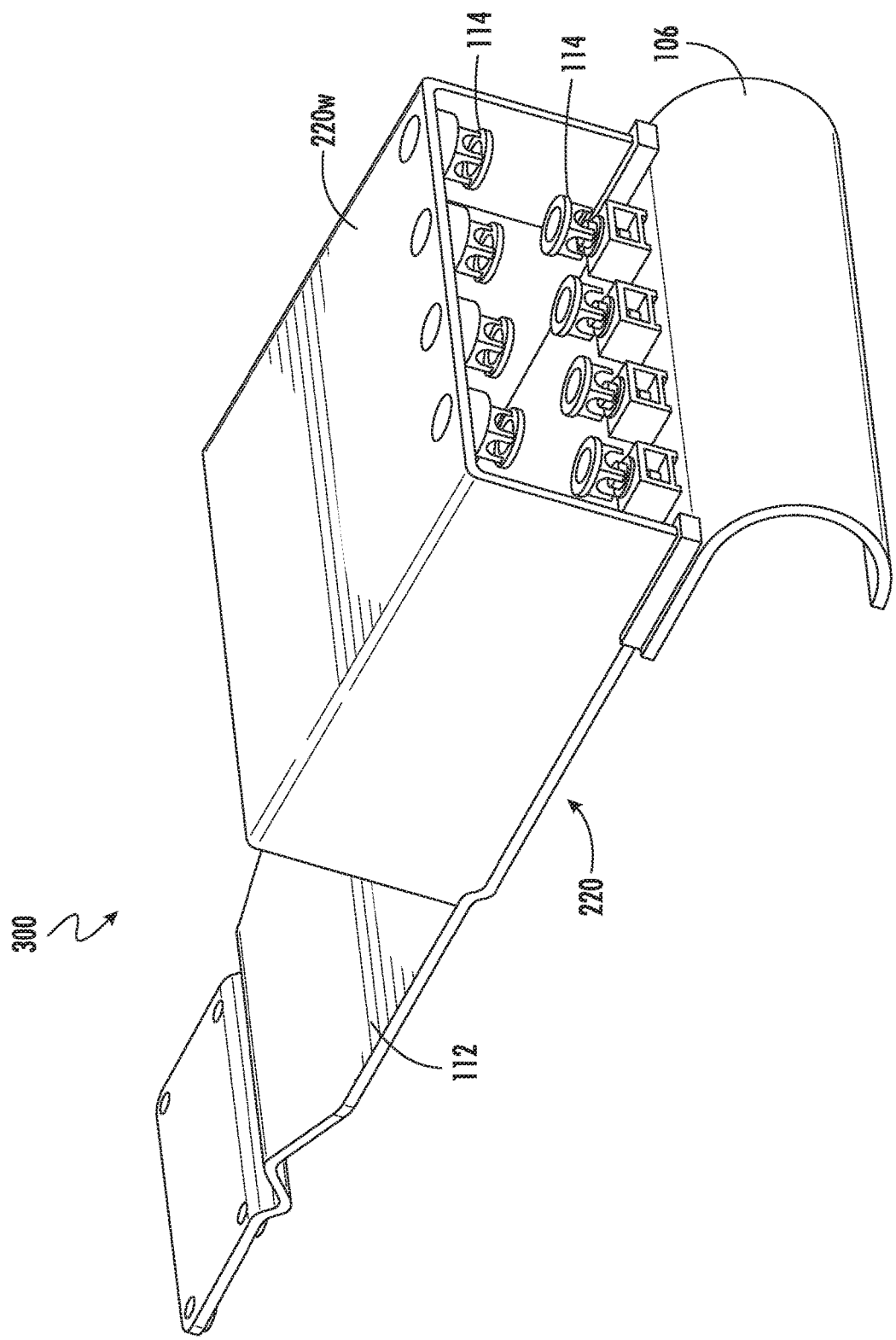
FIG. 13 is a side perspective view of a cable support bracket according to alternative embodiments of the present invention.

Referring to FIG. 13, a cable support bracket 300 according to alternative embodiments of the present invention is illustrated. In some embodiments, the cable support bracket 300 may comprise a shroud 220. In some embodiments, the shroud 220 may be coupled to or integral with the base 102 and have one or more walls 220*w*. The walls 220*w* of the shroud 220 may be configured to receive and secure a plurality of cable hangers 114. The cable support bracket 300 is configured to align the cable hangers 114 with the connection ports 152 of the antenna 150. For example, in some embodiments, a plurality of cable hangers 114 may be secured to an interior of one or more walls 220*w* of the shroud 220. As shown in FIG. 13, the cable hangers 114 may be attached to and hang down from the interior of a top wall 220*w* of the shroud 220 such that the cable hangers 114 may align with an upper row of connection ports 152.

In some embodiments, the shroud 220 may be configured to meet or overlap with the lower edge of the antenna 150 to cover cable connections at the bottom 150*b* of the antenna 150. The shroud 220 may also have a length such that the shroud covers the length of cable 250 extending between the connection ports 152 at the bottom 150*b* of an antenna 150 and the cable hangers 114, thereby protecting the cables 250 (and cable connection(s) to the antenna 150) from harsh environmental conditions (e.g., wind, rain, snow, etc.). In some embodiments, the shroud 220 may be configured to fit around the radome of an antenna 150 (or in some embodiments may be integral with the radome) and may assist in mounting the cable support bracket 300 to the antenna 150 or may be used as additional support when the bracket 100 is mounted to an antenna 150.

Methods for organizing coaxial cable connections at a base station antenna are also provided. In some embodiments, a method may comprise providing a cable support bracket, the support bracket comprising: a base configured to be mounted to an antenna, the base comprising a plurality of base standoff platforms, each standoff platform configured to receive a cable hanger; a cable guide having a generally arced outer surface, wherein the cable guide is coupled to or integral with the base and extends outwardly from one end of the base; and a plurality of cable hangers, each cable hanger secured in a respective base standoff platform; mounting the cable support bracket to an antenna having a plurality of connection ports such that each cable hanger aligns with a respective connection port; connecting a plurality of coaxial cables to the plurality of connection ports, wherein each coaxial cable is connected to a respective connection port; and securing each coaxial cable to a respective cable hanger.

In some embodiments, the method may comprise providing a cable support bracket, the support bracket comprising: a base configured to be mounted to an antenna and configured to receive and secure a first plurality of cable hangers; a bridge removably attached to the base, the bridge configured to receive and secure a second plurality of cable hangers; and a cable guide having a generally arced outer profile, wherein the cable guide is coupled to or integral with the base and extends outwardly from one end of the base; mounting the cable support bracket to an antenna having a plurality of connection ports such that each cable hanger aligns with a respective connection port; connecting a plurality of coaxial cables to the plurality of connection ports, wherein each coaxial cable is connected to a respective connection port; and securing each coaxial cable to a respective cable hanger The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A cable support bracket, the bracket comprising:
   a base configured to be mounted to an antenna, the base comprising a plurality of apertures, each aperture configured to receive a cable hanger;
   a cable guide having a generally arced outer profile configured to maintain a minimum bend radius of a coaxial cable connected to the antenna, wherein the cable guide is coupled to or integral with the base and extends outwardly from one end of the base; and
   a plurality of cable hangers, each cable hanger secured in a respective aperture in the base.

2. The cable support bracket of claim 1, wherein the base comprises a plurality of base standoff platforms, each standoff platform configured to receive a cable hanger, wherein a cable hanger is secured in a respective base standoff platform.

3. The cable support bracket of claim 1, the bracket further comprising:
   a bridge removably attached to the base, the bridge comprising a plurality of apertures, each bridge aperture configured to receive a respective cable hanger; and
   a second plurality of cable hangers, each cable hanger secured in a respective aperture in the bridge.

4. The cable support bracket of claim 3, wherein the bridge comprises a plurality of bridge standoff platforms, each bridge standoff platform configured to receive a cable hanger, wherein a cable hanger is secured in a respective bridge standoff platform.

5. The cable support bracket of claim 1, in combination with a plurality of cables, wherein at least one of the cables is secured within at least one of the plurality of cable hangers.

6. The cable support bracket of claim 1, wherein the base further comprises at least one support ridge.

7. The cable support bracket of claim 1, wherein the bracket is formed of a non-metallic material.

8. The cable support bracket of claim 1, wherein the cable guide has a radius of about 2 inches or greater.

9. The cable support bracket of claim 1, wherein the bracket has a length in the range of about 20 inches to about 30 inches and a width in the range of about 10 inches to about 36 inches.

10. The cable support bracket of claim 1, wherein the bridge has a height in the range of about 3 inches to about 6 inches.

11. An antenna assembly, the assembly comprising:
an antenna; and
a cable support bracket, the cable support bracket comprising:
a base configured to be mounted to the antenna, the base comprising a plurality of apertures, each aperture configured to receive a cable hanger;
a cable guide having a generally arced outer profile, wherein the cable guide is coupled to or integral with the base and extends outwardly from one end of the base; and
a plurality of cable hangers, each cable hanger secured in a respective aperture in the base,
wherein the cable support bracket is mounted to the antenna.

12. The antenna assembly of claim 11, wherein the base comprises a plurality of base standoff platforms, each standoff platform configured to receive a cable hanger, wherein a cable hanger is secured in a respective base standoff platform.

13. The antenna assembly of claim 11, wherein the cable support bracket of the assembly further comprises a bridge removably attached to the base, the bridge comprising a plurality of apertures, each bridge aperture configured to receive a respective cable hanger; and a second plurality of cable hangers, each cable hanger secured in a respective aperture in the bridge.

14. The antenna assembly of claim 13, wherein the bridge comprises a plurality of bridge standoff platforms, each bridge standoff platform configured to receive a cable hanger, wherein a cable hanger is secured in a respective bridge standoff platform.

15. The antenna assembly of claim 11, in combination with a plurality of cables, wherein at least one of the cables is secured within at least one of the plurality of cable hangers.

16. The antenna assembly of claim 11, wherein the bracket is formed of a non-metallic material.

17. An antenna assembly, in combination with a plurality of cables, the assembly comprising:
an antenna; and
a cable support bracket, the support bracket comprising:
a base configured to be mounted to an antenna, the base comprising a plurality of apertures, each aperture configured to receive a cable hanger;
a cable guide having a generally arced outer profile, wherein the cable guide is coupled to or integral with the base and extends outwardly from one end of the base; and
a plurality of cable hangers, each cable hanger secured in a respective aperture in the base,
wherein the cable support bracket is mounted to the antenna, and
wherein at least one of the plurality of cables is secured within at least one of the plurality of cable hangers.

18. The cable support bracket of claim 17, the bracket further comprising:
a bridge removably attached to the base, the bridge comprising a plurality of apertures, each bridge aperture configured to receive a respective cable hanger; and
a second plurality of cable hangers, each cable hanger secured in a respective aperture in the bridge.

19. The antenna assembly of claim 17, wherein the plurality of cables is coaxial cables.

20. The antenna assembly of claim 17, wherein the bracket is formed of a non-metallic material.

* * * * *